(12) United States Patent
Rossi

(10) Patent No.: US 9,475,575 B2
(45) Date of Patent: Oct. 25, 2016

(54) CONVERTIBLE COMPOUNDED ROTORCRAFT

(71) Applicant: The Boeing Company, Chicago, IL (US)

(72) Inventor: Glenn T. Rossi, Ambler, PA (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 14/564,775

(22) Filed: Dec. 9, 2014

(65) Prior Publication Data

US 2015/0115096 A1 Apr. 30, 2015

Related U.S. Application Data

(63) Continuation of application No. 13/661,567, filed on Oct. 26, 2012, now Pat. No. 8,950,698.

(51) Int. Cl.
| | |
|---|---|
| *B64C 27/26* | (2006.01) |
| *B64C 37/02* | (2006.01) |
| *B64C 29/02* | (2006.01) |
| *B64C 39/00* | (2006.01) |
| *B64C 39/02* | (2006.01) |
| *B64D 5/00* | (2006.01) |
| *B64C 27/28* | (2006.01) |
| *B64C 29/00* | (2006.01) |

(52) U.S. Cl.
CPC .............. *B64C 27/26* (2013.01); *B64C 27/28* (2013.01); *B64C 29/0033* (2013.01); *B64C 29/02* (2013.01); *B64C 37/02* (2013.01); *B64C 39/003* (2013.01); *B64C 39/024* (2013.01); *B64D 5/00* (2013.01); *B64C 2201/082* (2013.01); *B64C 2201/206* (2013.01)

(58) Field of Classification Search
CPC ... B64C 27/26; B64C 29/0033; B64C 27/28; B64C 39/024; B64C 39/003; B64C 29/02; B64C 37/02; B64C 2201/206; B64C 2201/082; B64D 5/00
See application file for complete search history.

(56) References Cited

U.S. PATENT DOCUMENTS

| | | | |
|---|---|---|---|
| 2,843,337 A | 7/1958 | Bennett | |
| 2,876,677 A | 3/1959 | Clark et al. | |
| 3,227,399 A | 1/1966 | Dastoli et al. | |
| 3,298,633 A | 1/1967 | Datoli et al. | |
| 4,267,987 A | 5/1981 | McDonnell | |
| 4,678,141 A | 7/1987 | Sarrantonio | |
| 4,757,959 A | 7/1988 | Schroder et al. | |
| 5,000,398 A | 3/1991 | Rashev | |
| 5,765,783 A | 6/1998 | Albion | |
| 7,946,530 B1 * | 5/2011 | Talmage, Jr. | B64C 27/006 244/118.2 |
| 7,997,526 B2 | 8/2011 | Greenley | |
| 8,434,710 B2 | 5/2013 | Hothi et al. | |

* cited by examiner

*Primary Examiner* — Brian M O'Hara
*Assistant Examiner* — Michael Kreiner
(74) *Attorney, Agent, or Firm* — Walters & Wasylyna LLC

(57) ABSTRACT

A compound rotorcraft including a rotary wing aircraft having a fuselage and at least one rotor and a fixed-wing aircraft coupled to the rotary wing aircraft, wherein the rotary wing aircraft can fly on the rotor or the fixed-wing aircraft, and wherein the fixed-wing aircraft is detachable from the rotary wing aircraft to fly independently.

20 Claims, 12 Drawing Sheets

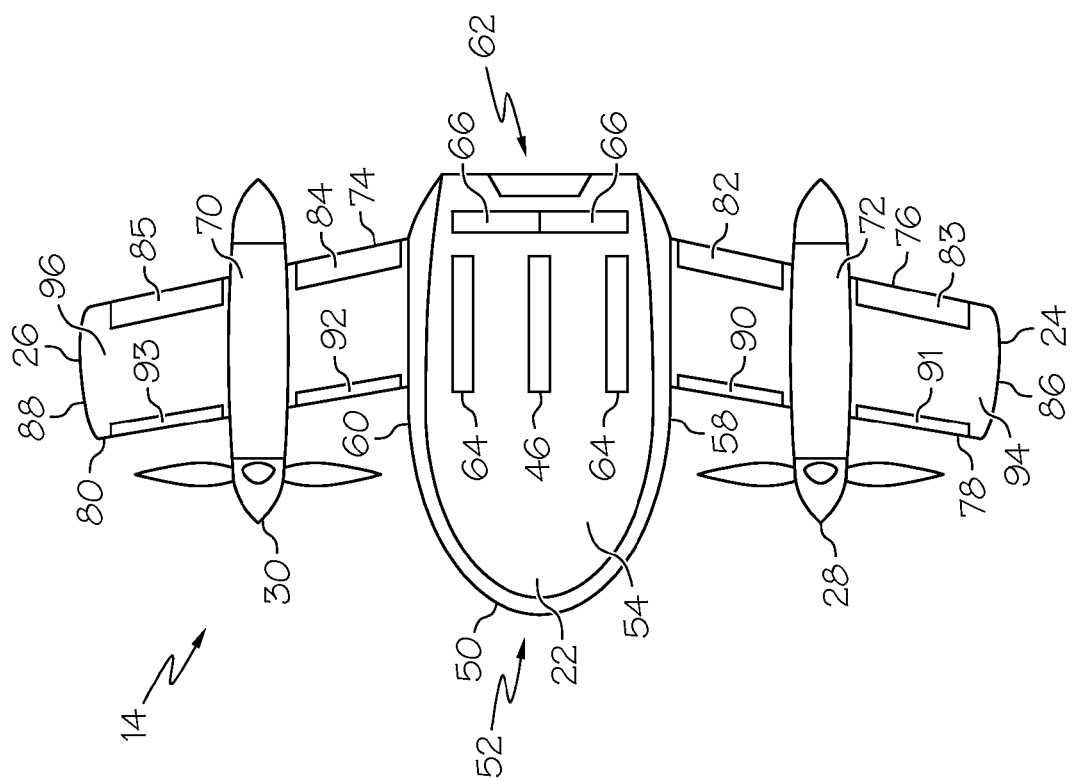
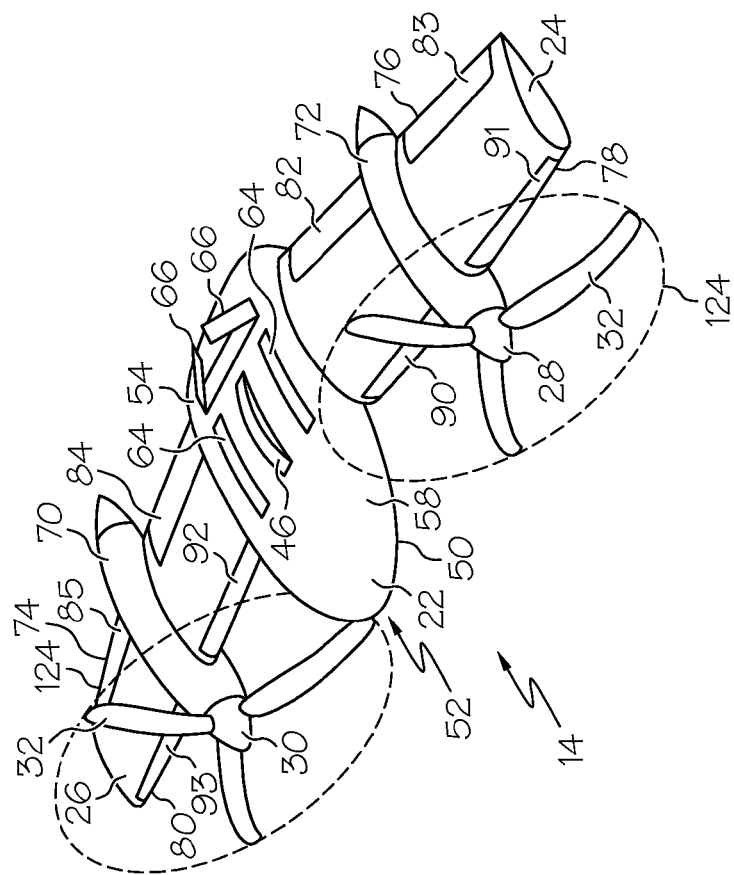
FIG. 8
FIG. 7

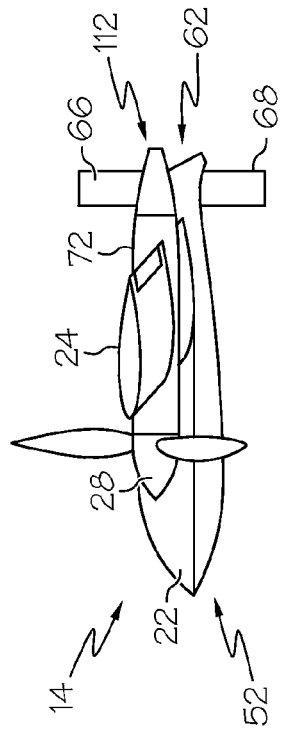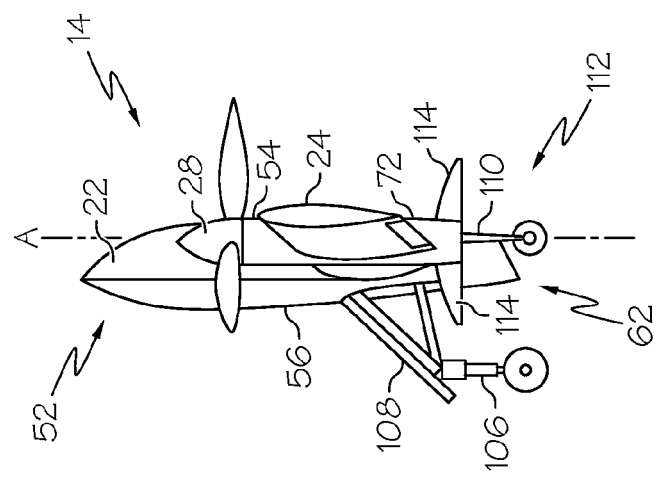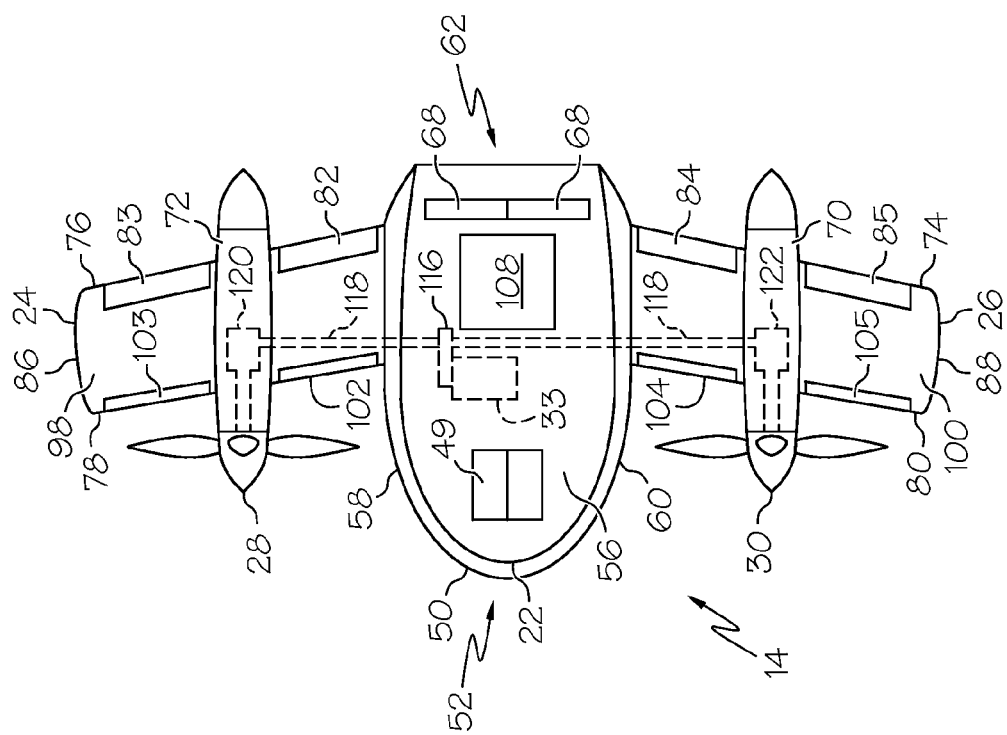

CONVERTIBLE COMPOUNDED ROTORCRAFT

PRIORITY

This application is a continuation of, and claims priority from, U.S. Ser. No. 13/661,567 filed on Oct. 26, 2012.

FIELD

The present disclosure is generally related to aircraft and, more particularly, to a compound rotorcraft having a fixed-winged aircraft removably coupled to a rotary wing aircraft.

BACKGROUND

Various types of rotary wing aircraft have been developed having particular performance and mission capabilities. In order to improve the performance or capability of a traditional rotary wing aircraft, such as a single rotor or tandem rotor helicopter, the rotary wing aircraft must be installed with compounding features like wings, thrust engines, propeller, rotors, sensor systems, or weapons systems on the aircraft itself. Installation of such compounding features requires significant modification to the rotary wing aircraft and adds complexity, cost, and weight. Such compounding modifications also increase the required installed power of the rotary wing aircraft.

Accordingly, those skilled in the art continue with research and development efforts in the field of compounding rotary wing aircraft to improve performance and mission capabilities.

SUMMARY

In one embodiment, the disclosed compound rotorcraft may include a rotary wing aircraft comprising a fuselage and at least one rotor, and a fixed-wing aircraft releasably coupled to the rotary wing aircraft.

In another embodiment, the disclosed compound rotorcraft may include a rotary wing aircraft having a fuselage and at least one rotor and a fixed-wing aircraft coupled to the rotary wing aircraft, wherein the rotary wing aircraft can fly on the rotor or the fixed-wing aircraft, and wherein the fixed-wing aircraft is detachable from the rotary wing aircraft to fly independently.

In another embodiment, the compound rotorcraft may include a fixed-wing aircraft having a wing and a propulsion drive and configured to be coupled to a rotary wing aircraft, the rotary wing aircraft initially having a fuselage and at least one rotor, wherein the rotary wing aircraft can fly on the rotor or the fixed-wing aircraft, and wherein the fixed-wing aircraft is detachable from the rotary wing aircraft to fly independently.

In yet another embodiment, disclosed is a method of compounding a rotary wing aircraft having a fuselage and at least one rotor, the method may include the steps of: (1) providing a fixed-wing aircraft including at least one wing and a propulsion drive, and (2) coupling the fixed-wing aircraft to the rotary wing aircraft to form a compound aerial platform, wherein the rotary wing aircraft can fly on the rotor or the fixed-wing aircraft, and wherein the fixed-wing aircraft is detachable from the rotary wing aircraft to fly independently.

Other embodiments of the disclosed compound rotorcraft will become apparent from the following detailed description, the accompanying drawings and the appended claims.

BRIEF DESCRIPTION OF THE DRAWINGS

FIG. 7 is a perspective view of the fixed-winged aircraft;

FIG. 8 is a top plan view of the fixed-winged aircraft of FIG. 7;

FIG. 9 is a bottom plan view of the fixed-winged aircraft of FIG. 7;

FIG. 10 is a side elevational view of the fixed-winged aircraft of FIG. 7;

FIG. 11 is a side elevational view of the fixed-winged aircraft of FIG. 7;

DETAILED DESCRIPTION

Figure 1:
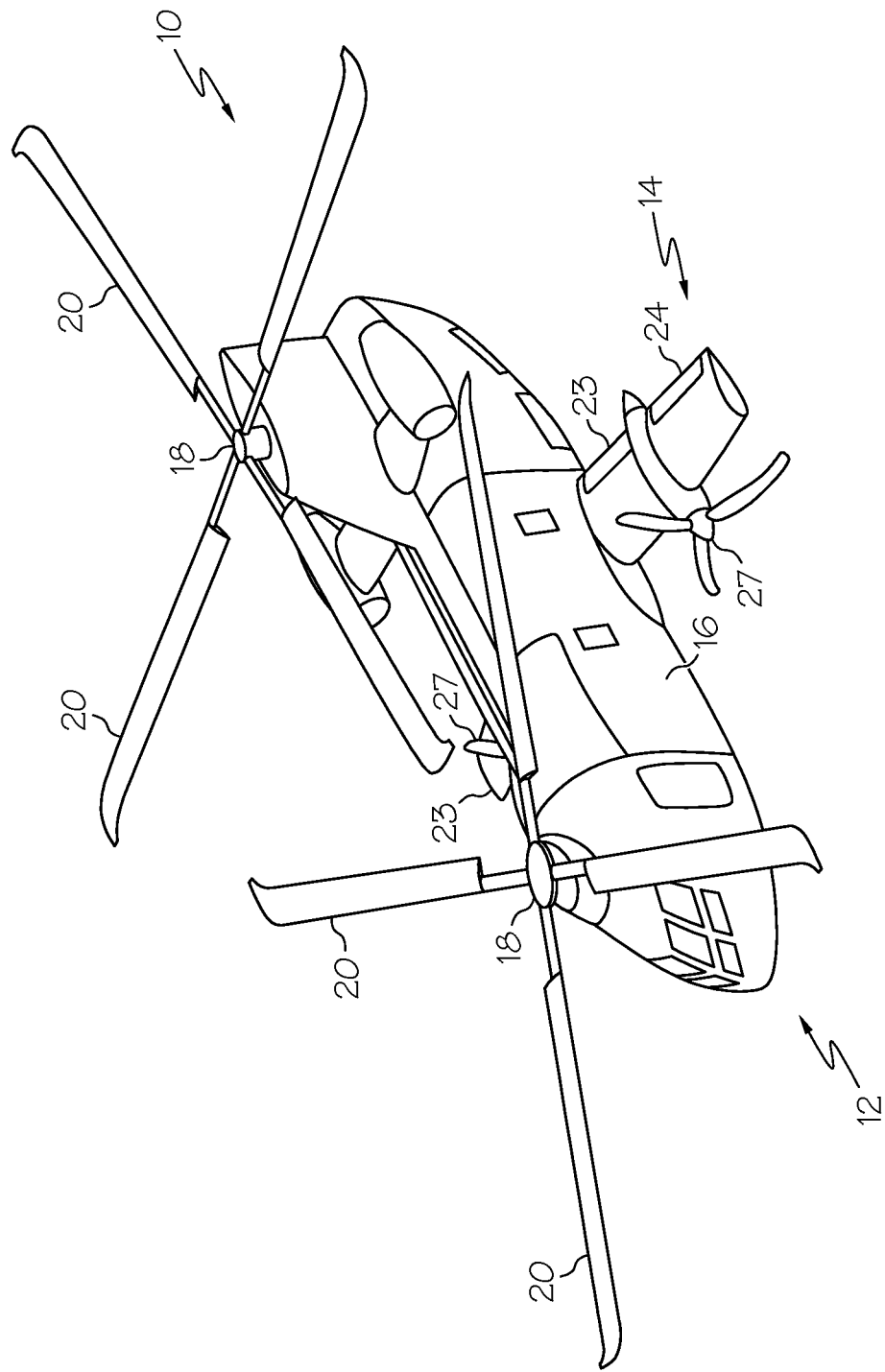
FIG. 1 is a perspective view of one embodiment of the disclosed compound rotorcraft.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
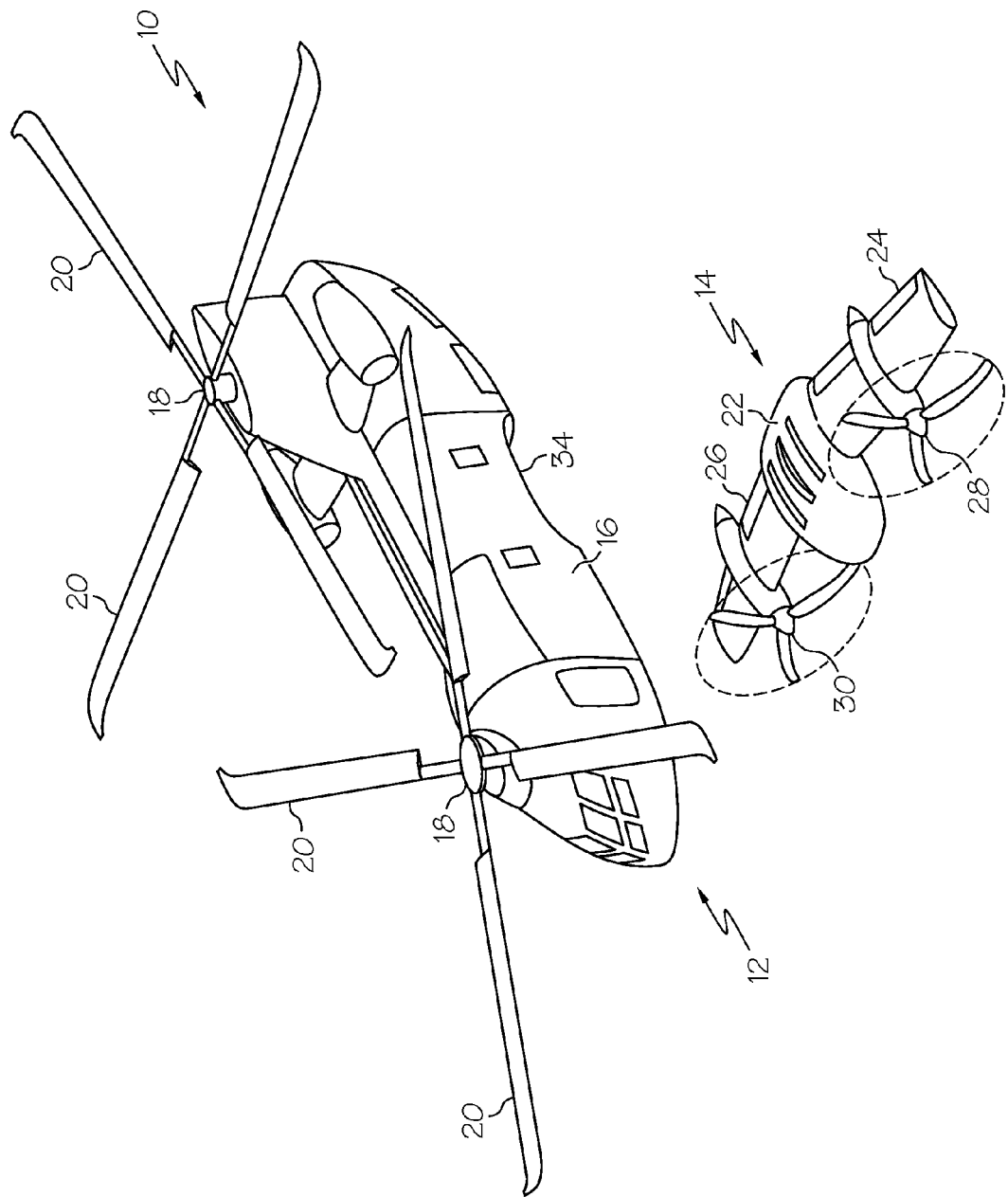
FIG. 2 is a perspective view of the disclosed compound rotorcraft depicted with a fixed-wing aircraft separated from a rotary wing aircraft.

Referring to FIGS. 1 and 2, a compound rotorcraft, generally designated 10 may include a rotary wing aircraft 12 and a fixed-wing aircraft 14. The fixed-wing aircraft 14 may be releasably coupled to the rotary wing aircraft 12.

The rotary wing aircraft 12 may be any type of flying machine that uses lift generated by rotor blades, for example a helicopter. The rotary wing aircraft 12 may include a fuselage 16 and at least one rotor 18. The rotor 18 may be powered by an engine and may include a transmission mechanically connected between the engine and a rotor mast connected to the rotor 18 and a controls system. The rotary wing aircraft 12 may include a main rotor 18 and a tail rotor or, as illustrated in the drawings, may include two rotors 18 in tandem, typically rotating in opposite directions in order to cancel the torque reaction so that no tail rotor or other yaw stabilizer in required. Each rotor 18 may include at least two rotor blades 20; four blades 20 are shown by example. The rotary wing aircraft 12 may optionally include additional thrust engines.

Figure 3:
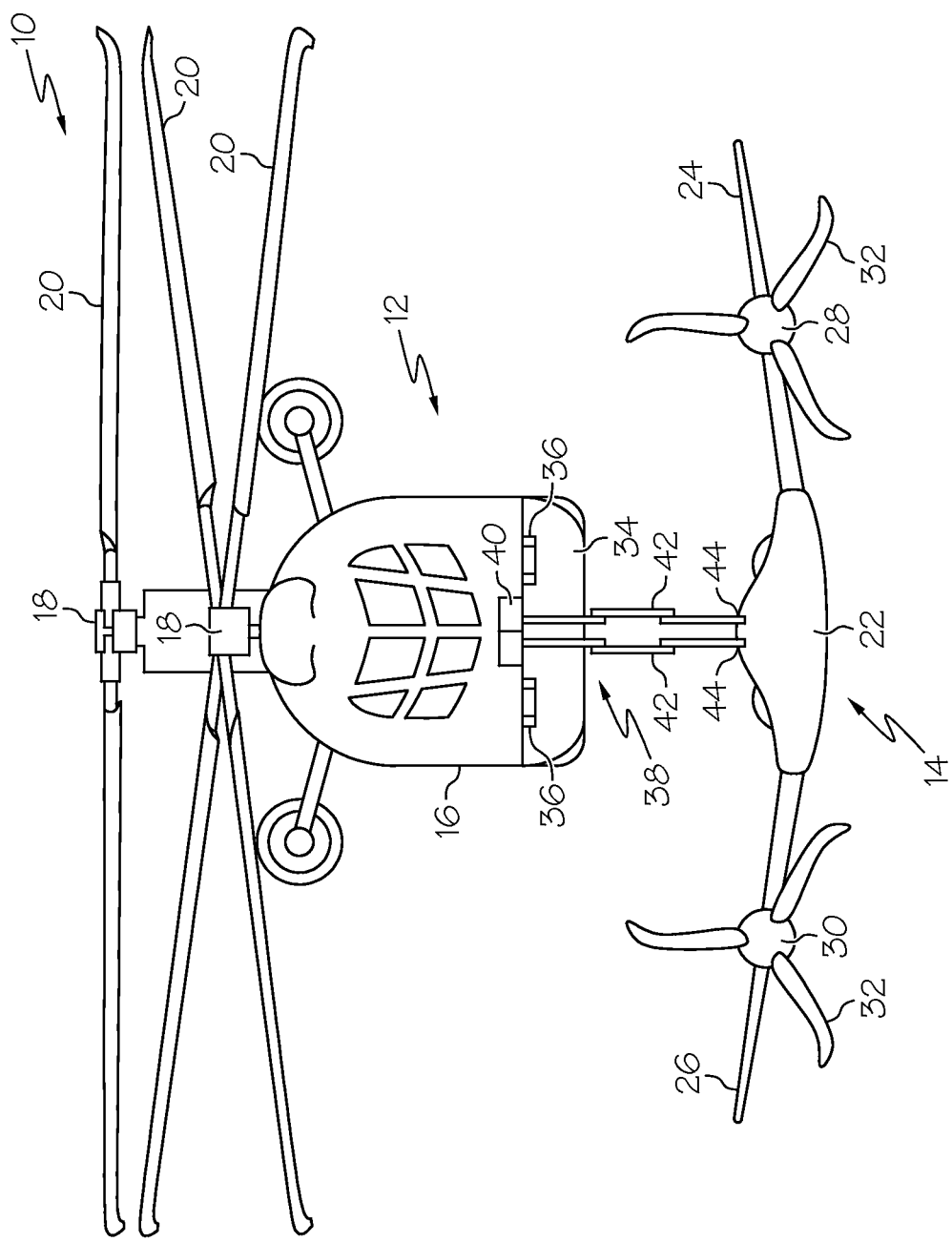
FIG. 3 is a front elevational view of the disclosed compound rotorcraft.

The fixed-wing aircraft 14 may include at least one wing 23 and a propulsion drive 27 mounted to the wing 23. As shown in FIGS. 2 and 3, the fixed-wing aircraft 14 may include a center body 22, a left wing 24, a right wing 26, a left proprotor 28, and a right proprotor 30 (i.e., the propulsion drives 27). Each proprotor 28, 30 may include at least two proprotor blades 32, three are shown by example. It can be appreciated by one skilled in the art that while the propulsion drive 27 is illustrated and described as proprotors, the fixed-wing aircraft 14 may utilize thrust engines mounted to the wings 24, 26 and, as such, the discussion of proprotors is not meant to limit the present disclosure.

As shown in FIG. 9, the fixed-wing aircraft 14 may include an engine 33, such as single or dual turbine engines, and controls system, including communications and mission systems and a navigation and guidance sensor suite with autonomous flight software. The engine 33 and proprotor assemblies 28, 30 may be of any suitable type mounted on the wings 24, 26 and extending forward of a leading edge of the wing 24, 26.

The fixed-wing aircraft 14 may be coupled to the fuselage 16 of the rotary wing aircraft 12, such that the rotary wing aircraft 12 may fly upon the rotors 18 or may fly upon the wings 24, 26 and proprotors 28, 30 of the fixed-wing aircraft 14. When coupled to the rotary wing aircraft 12, the fixed-wing aircraft 14 may provide additional propulsion and lift for speed augmentation, i.e., increased cruise and dash speeds, of the rotary wing aircraft 12, which normally flies on the edgewise rotors 18.

The fixed-wing aircraft 14 may provide compounding features, which at the same time are usable as a separate entity aircraft independent of the rotary wing aircraft 12. The rotary wing aircraft 12 may be any existing rotorcraft modified to accept the docking of a suitably designed fixed-wing aircraft 14 or may be any rotorcraft designed to accept docking of a corresponding fixed-wing aircraft 14.

The fixed-wing aircraft 14 may be an unmanned aerial vehicle (UAV), an unmanned aircraft system (UAS), or may be optionally manned by one or more pilots. For an unmanned implementation, the fixed-wing aircraft 14 may be controlled by a pilot from within the rotary wing aircraft 12, remotely by a navigator on the ground, or by an onboard computer system. In one embodiment of the disclosed compound rotorcraft and winged aircraft 10, the fixed-wing aircraft 14 may be a vertically launchable and recoverable winged aircraft. As such, the fixed-wing aircraft may be a tail-sitting vertical takeoff and landing vehicle. For a manned implementation, the fixed-wing aircraft 14 may include a cockpit where a pilot may fly in a standing position at takeoff and in a prone position during fixed-wing flight.

Referring to FIGS. 3 through 6, the fixed-wing aircraft 14 may be coupled to the rotary wing aircraft 12 at or near a midpoint of the fuselage 16 and at a lowest portion of the outer mould line of the rotary wing aircraft 12. The rotary wing aircraft 12 may include a docking bay 34 disposed about the lower midpoint of the fuselage 16. The docking bay 34 may be suitably sized to properly receive the center body 22 and optionally a portion of the wings 24, 26 of the fixed-wing aircraft 14. The docking bay 34 may include at least one cabin docking port 36, two laterally spaced apart and aligned docking ports 36 are shown by example; each docking port 36 may include at least one hard docking point and at least one electronic control connection for mechanical and electrical connection between the rotary wing aircraft 12 and the fixed-wing aircraft 14. In one instance, the rotary wing aircraft includes one docking port having a mechanical docking point and electrical connection to mechanically and electrically couple the fixed-wing aircraft to the rotary wing aircraft. In another instance, said fixed-wing aircraft includes one docking port connector having a mechanical docking connector and electrical connector to mechanically and electrically connect to said docking port.

The fixed-wing aircraft 14 may dock and undock with the rotary wing aircraft 12 on the ground or in-flight to form the coupled platform, i.e., the compound rotorcraft 10. When the fixed-wing aircraft 14 is docked, any forward and aft cargo hooks provided on the rotary wing aircraft 12 remain accessible and usable for any external loads. A hatch may be provided within the cabin of the rotary wing aircraft 12 to allow access to the equipment bay of the fixed-wing aircraft 14 in order to refuel or rearm inflight.

The rotary wing aircraft 12 may include a docking trapeze 38 disposed within the docking bay 34. The docking trapeze 38 may extend downwardly from the docking bay 34 to contact the fixed-wing aircraft 14 during docking and undocking, whether on ground or inflight. The docking trapeze 38 may include at least one motor 40, at least one actuator mechanism 42, and at least one latching mechanism 44. The motor 42 may be any suitable electric, hydraulic, or pneumatic motor, for example a cabin-mounted winching motor 42. The actuator mechanism 42 may be any suitable linear actuator, for example a scissor linkage mechanism, a telescoping mechanism, or a ball-screw drive mechanism. In one example, the rotary wing aircraft may include a docking trapeze to engage said fixed-wing aircraft. In one instance, the docking trapeze includes a motor, a downwardly extending actuator mechanism driven by said motor, and a latching mechanism disposed at a lower end of said actuator mechanism to releasably engage the fixed-wing aircraft.

As illustrated in the Figures, a pair of laterally spaced scissor linkage actuator mechanisms 42 may be used. The latching mechanism 44 may be disposed at the lower, free end 45 of the actuator mechanism 42 to engage corresponding latching port 46 (FIG. 7) disposed on the surface of the center body 22 of the fixed-wing aircraft 14. The latching mechanism 44 may be any suitable latching or clamping device. For example, the latching mechanism 44 may be of a type which is adapted to automatically engage and latch the latching port 46 when received therein and can be manually or automatically operated to effect a release. The docking trapeze 38 may include shock absorbers or dampeners to attenuate any shock from docking impacts.

At this point it can be appreciated by one skilled in the art that the fixed-wing aircraft 14 may be suitably sized and tailored to meet the docking requirements of each particular model or type of rotary wing aircraft 12. For example, the overall size of the fixed-wing aircraft 14 may be larger for pairing with a tandem rotor rotorcraft, such as a Chinook, and may be smaller for pairing with a single main rotor rotorcraft, such as a Blackhawk.

Figure 4:
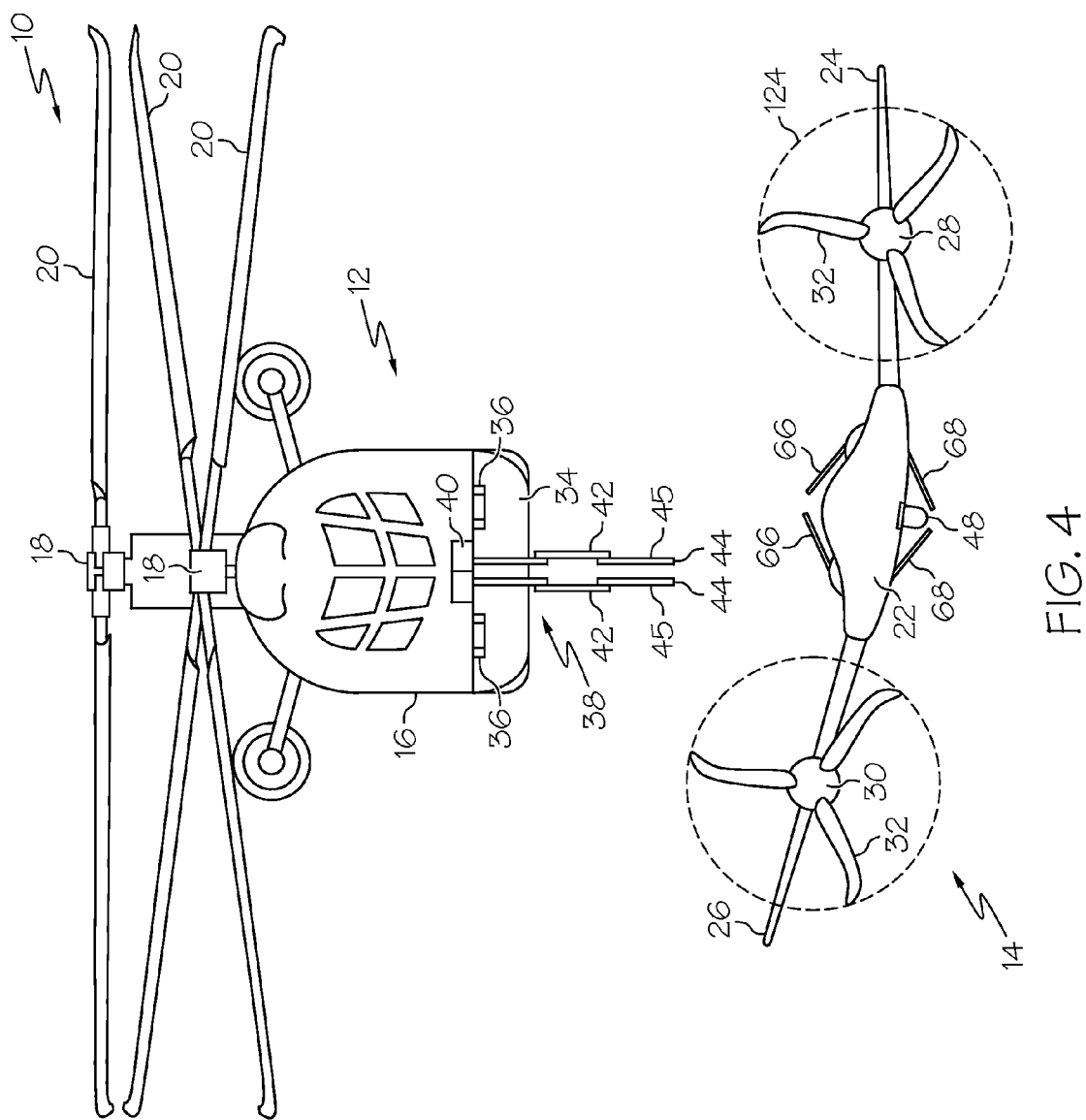
FIG. 4 is a front elevational view of the disclosed compound rotorcraft depicted with the fixed-wing aircraft separated.
Figure 5:
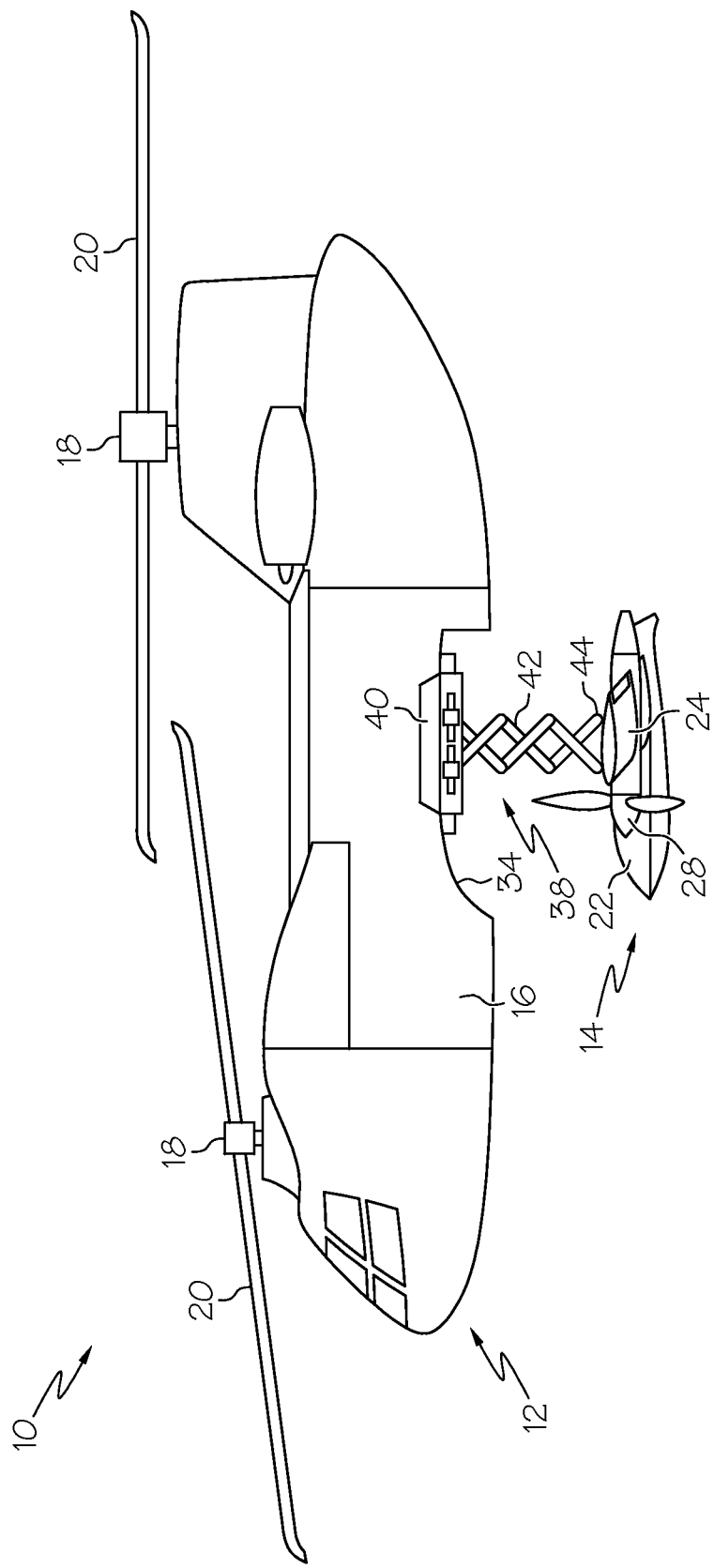
FIG. 5 is a side elevational view of the disclosed compound rotorcraft of FIG. 3.
Figure 6:
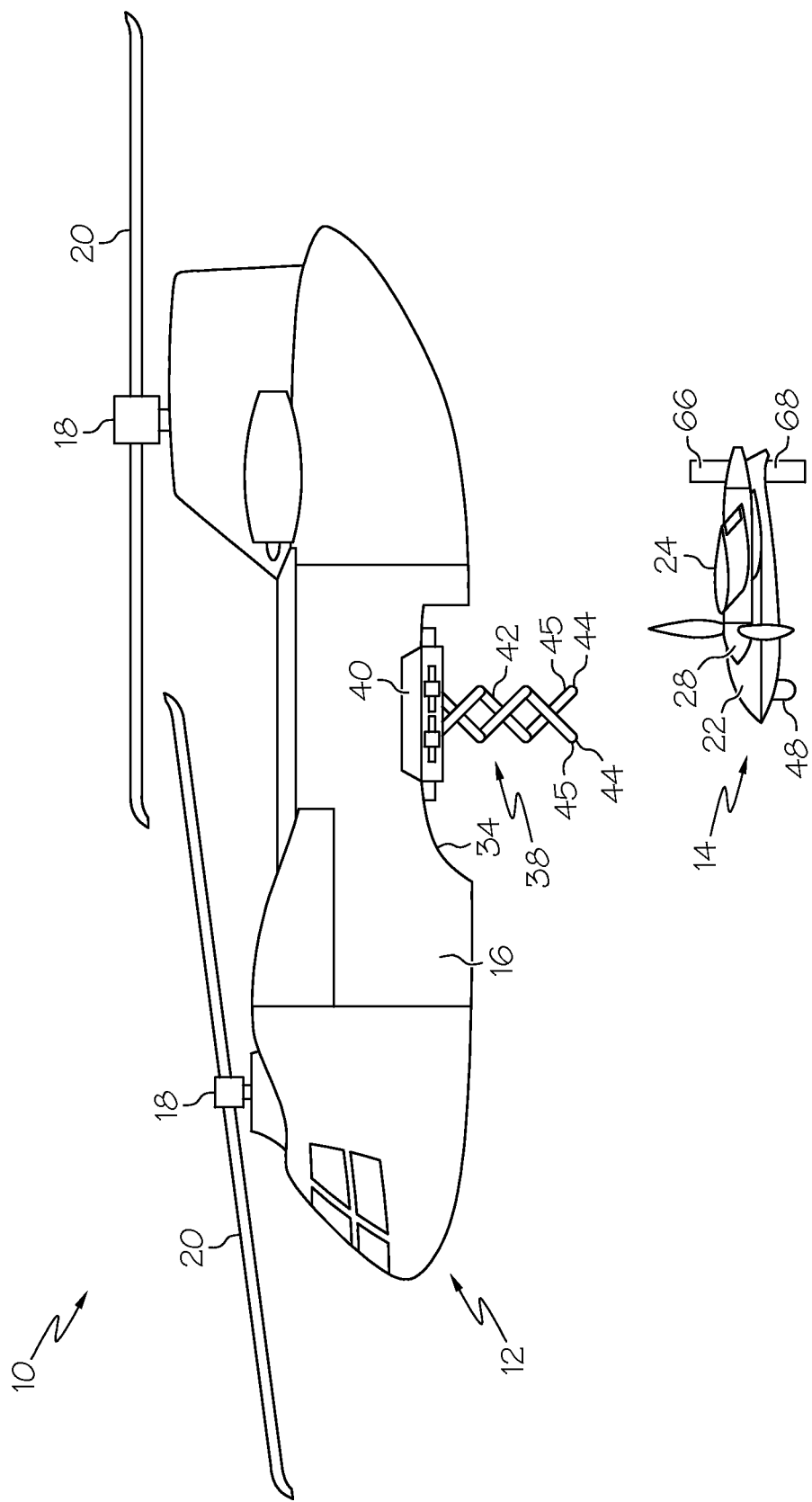
FIG. 6 is a side elevational view of the disclosed compound rotorcraft of FIG. 4.

As illustrated in FIGS. 4 and 6, the fixed-wing aircraft 14 may be detached inflight and utilized as a high speed armed escort or "wingman" or as a beyond-line-of-sight (BLOS) sensor platform. The fixed-wing aircraft 14 may include various retractable, internal, or external payloads 48, such as FLIR® thermal imaging laser designators, direct energy weapons (DEW), electronic warfare (EW) weapons, air-to-surface (ASM) missiles (e.g., Hellfire missiles), defense advanced GPS receivers (DAGR), machine guns, or fuel. Retractable payloads 48 may be housed within a payload bay and covered by retractable or pivotable payload bay doors 49 (FIG. 9).

Referring now to FIGS. 7 through 11, the center body 22 of the fixed-wing aircraft 14 may include a nose 50 at a front end 52, a top surface 54, a bottom surface 56, a left side 58, a right side 60, and a rear end 62. The center body 22 and wings 24, 26 together form the preferred airframe of the fixed-wing aircraft 14 and define the forward direction of flight. Alternatively, the airframe may not include a center body 22, instead being a flying wing. In such a case, the wing's leading edge would define the forward direction of flight for the fixed-wing aircraft 14. The fixed-wing aircraft 14 may include at least one latching port 46 on the center body 22. The latching port 46 may be disposed on the top surface 54, as illustrated, or on the bottom surface 56 of the center body 22. At least one docking port connector 64, corresponding to the docking port 36, may be disposed on the center body 22, two laterally spaced apart and aligned docking port connectors 64 are shown by example. The docking port connector 64 may include at least one hard docking point connector and at least one electronic control connector compliant with and connectable to the docking points and electronic connections of the docking ports 36 of the rotary wing aircraft 12 for mechanical and electrical connection.

The fixed-wing aircraft 14 may also include a pair of upper surface stabilators 66 and a pair of lower surface stabilators 68, which pivot outwardly or unfold during flight. The stabilators 66, 68 may pivot forward to about a ninety-degree (90°) angle to the center body surfaces 54, 56, when deployed. When retracted, the stabilators 66, 68 may be substantially flush with the center body surfaces 54, 56. The stabilators 66, 68 may be at about a ninety-degree (90°) angle to each other.

The wings 24, 26 may extend outboard and forwardly from the sides 58, 60 of the center body 22, respectively. Therefore, the wing configuration may preferably be of the swept forward type, which allows for wing attachment toward the rear end 31 so that the center of gravity of the fixed-wing aircraft 14 is forward of the quarter chord of the wings 24, 26. Each wing 24, 26 may include a left nacelle 70 and a right nacelle 72, respectively, for containing the nacelle gearboxes 120, 122 (FIG. 9), which may be connected to the proprotors 28, 30. The nacelles 70, 72 may also include and house thrust engines in alternate embodiments of the fixed-wing aircraft 14. Alternatively, the wings 24, 26 may be large enough such that nacelles 70, 72 may not be necessary. The nacelles 70, 72 may be spanwise and centrally located on the wings 24, 26 and may extend chordwise from rearward of wing left and right trailing edges 74, 76 to forward of wing left and right leading edges 78, 80.

A rear portion of each wing 24, 26 may include left elevator-ailerons, or "elevons" 82, 83 and right elevons 84, 85. Left and right elevons 82, 84 may extend substantially between the nacelles 70, 72 and the center body 22. Left and right elevons 83, 85 may extend substantially between the nacelles 70, 72 and near the left and right outboard ends 86, 88 of each wing 24, 26. The elevons 82, 84 may form part of the wing trailing edge 74, 76. The elevons 82, 84 may perform functions normally associated with both ailerons and elevators on airplanes. Alternatively, the elevons 82, 84 could be full span elevons or there could be two elevons on the main portions of the wings 24, 26 spanning substantially between the nacelles 70, 72 and the center body 22.

The wings 24, 26 may each include left spoilers 90, 91 and right spoilers 92, 93. The wings 24, 26 on their upper surfaces 94, 96 may include upper spoilers 90, 92 which are spaced rearwardly from the wing leading edges 78, 80 and may extend spanwise from near the nacelles 70, 72 to near the center body 22. Likewise, upper spoilers 91, 93 may extend spanwise from near the nacelles 70, 72 to near the outboard wing ends 86, 88. The wings 24, 26 on their lower surfaces 98, 100 may include similarly located lower left spoilers 102, 103 and lower right spoilers 104, 105, as shown in FIG. 9. All spoilers 90, 91, 92, 93, 102, 103, 104, 105 near their front edge may be pivotably attached to the wing 24, 26, such that the spoilers 90, 91, 92, 93, 102, 103, 104, 105 may pivot forward to about a ninety-degree) (90° angle to the wing surfaces 94, 96, 98, 100, when deployed. When retracted, the spoilers 90, 91, 92, 93, 102, 103, 104, 105 may be substantially flush with the wing surfaces 94, 96, 98, 100.

Each wing 24, 26 may have a rounded leading edge 78, 80 and airfoil thickness ratio (wing thickness divided by chord length) suitable to have relatively stable stall characteristics. As the angle of attack increases to the point where the wings 24, 26 begin to stall, the stall occurs in a gradual, smooth, easily controllable manner. Alternatively, the leading edges 78, 80 may be sharp, and the thickness ratio much lower.

As seen in FIG. 11, retractable main landing gear 106 may be housed within the center body 22 and may extend outwardly from the bottom surface 56. When retracted, the landing gear 106 may be covered by retractable or pivotable landing gear bay doors 108. Secondary landing gear 110 may extend rearwardly from a rear end 112 of the nacelles 70, 72, substantially parallel to the central axes "A" of the nacelles 70, 72 and thus parallel to both the central chordwise-spanwise plane (the plane of the wing) and the shear plane of each respective wing 24, 26. The rear ends 112 of the nacelles 70, 72 may be bifurcated and include a pair of cover halves 114 such that each cover half 114 may pivot outwardly to expose the landing gear 110. Alternatively, the secondary landing gear 110 may extend rearwardly from the wings 24, 26 themselves. When separated from the rotary wing aircraft 12, the fixed-wing aircraft 14 may operate as a vertical takeoff and landing (VTOL) aircraft and may takeoff and land as a tail-sitter aircraft using cyclic pitch, collective pitch, or both in the proprotors 28, 30.

As illustrated in FIG. 9, the engine 33 and a main gearbox 116 may be located in the center body 22 as shown schematically in dashed lines. Two rotating shafts 118 deliver power from the main gearbox 116 to a left and right nacelle gearbox 120, 122, which are mounted within the nacelles 70, 72. Alternatively, a dual engine aircraft 14 may be provided where an engine 33 may be located within in each nacelle 70, 72 and directly connected to the proprotors 28, 30. The proprotors 28, 30 may rotate through a substantially circular planar section (actually very slightly upwardly conical) known as the disc 124. Each proprotor 28, 30 may be fastened to a pitch housing which may be pivotably connected to a barrel portion of a hub through a bearing. "Disc loading" is defined as the rotor thrust divided by the disc area. The fixed-wing aircraft 14 may be designed to be a low disc loading aircraft. The low weight of fixed-wing aircraft 14 may reduce the thrust necessary for flight, and the relatively long blades 32 may sweep out a relatively large disc area. The length of the blades 32 may be such that the diameter of the disc 124 may be slightly less than the span of the corresponding wing 24, 26. The effect of low disc loading is to reduce the velocity of the airstream induced by the proprotor 28, 30. In certain embodiments of the fixed-wing aircraft 14, fuel may be stored within the wings 24, 26 and provisions for emergency parachutes may also be provided.

Figure 12:
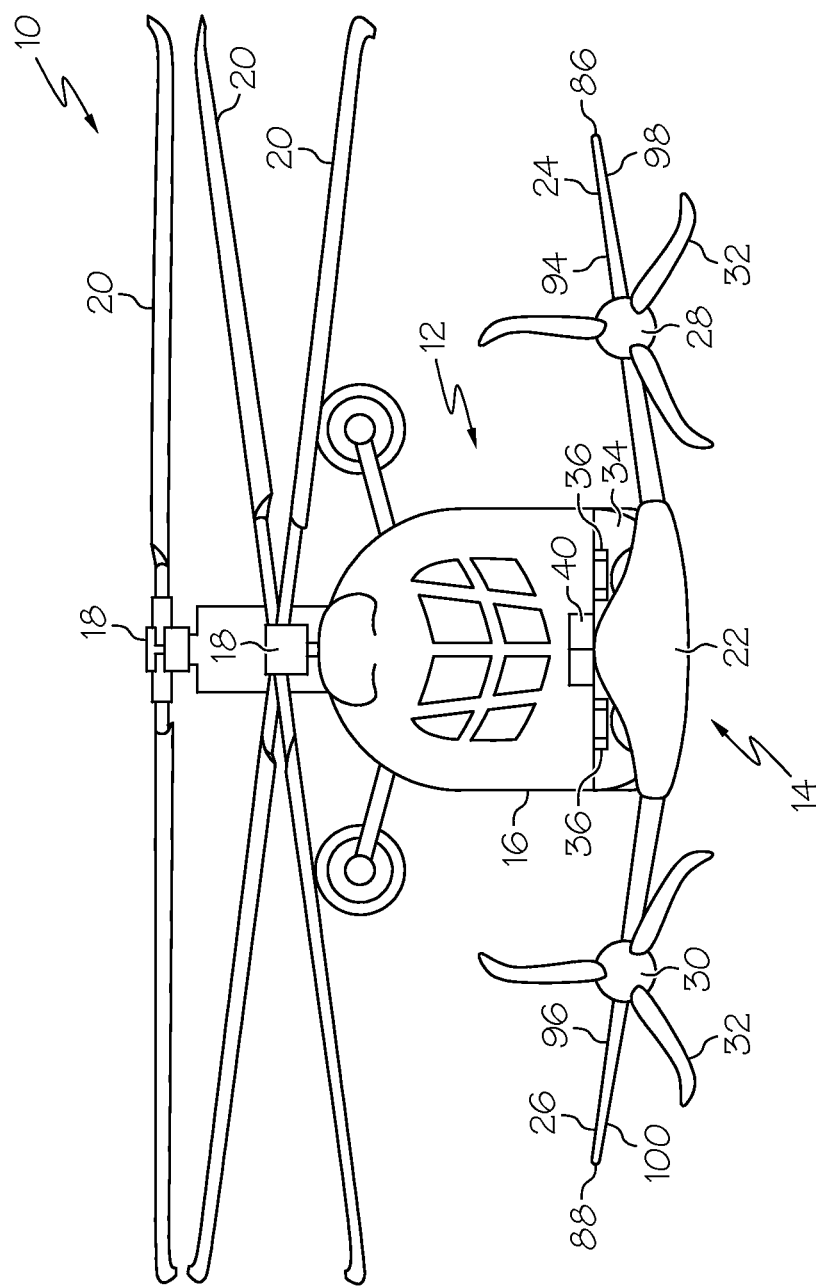
FIG. 12 is a front elevational view of another embodiment of the disclosed compound depicting the fixed-winged aircraft in a horizontal wing mode.
Figure 13:
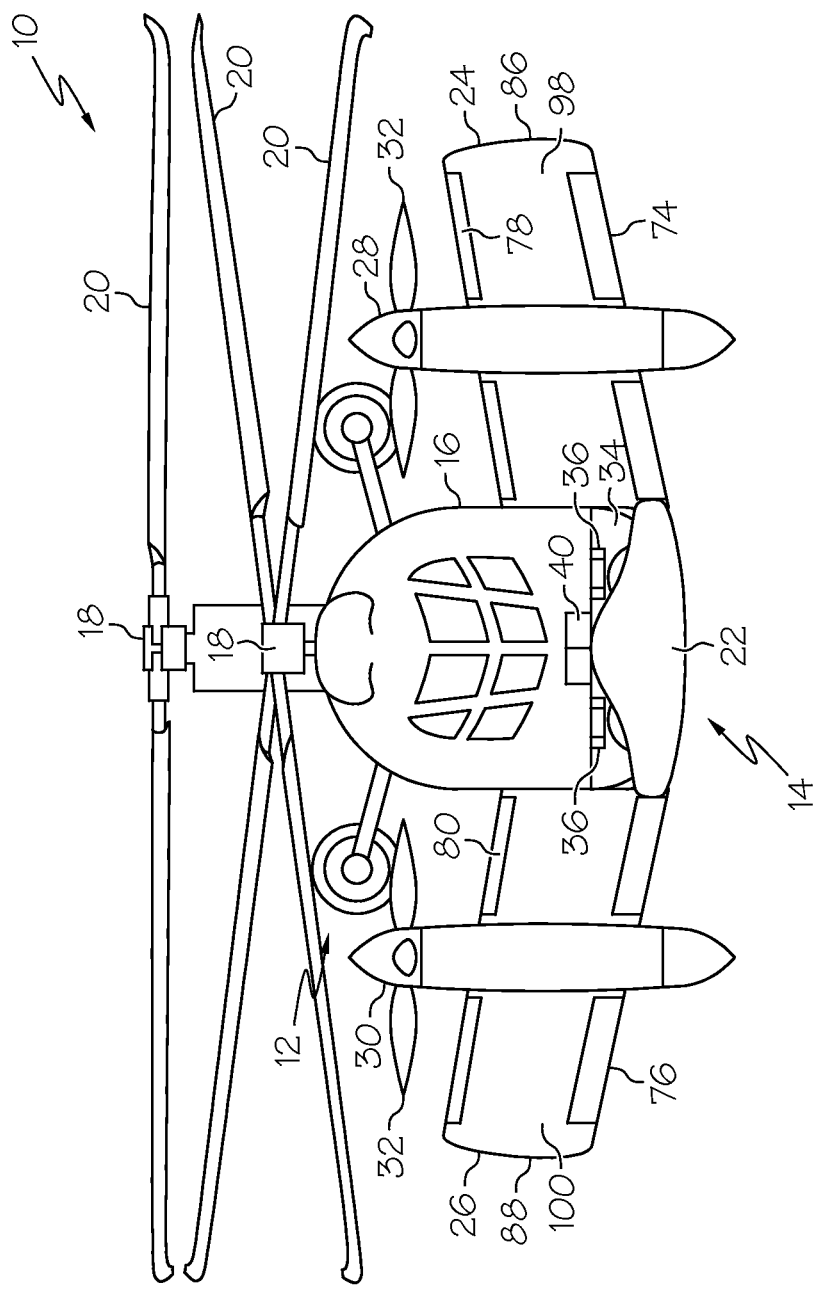
FIG. 13 is a front elevational view of the disclosed compound rotorcraft depicting the fixed-winged aircraft in a vertical wing mode.

Referring next to FIGS. 12 and 13, in another embodiment of the disclosed compound rotorcraft and winged aircraft 10, the fixed-wing aircraft 14 may be a tail-sitter with tilting wings 24, 26 that forms a quad-rotorcraft when coupled in with the a tandem rotor rotary wing aircraft 12 or a tri-rotorcraft when coupled with a single main rotor rotary wing aircraft 12. The wings 24, 26 may tilt between a horizontal mode (FIG. 12) and a vertical mode (FIG. 13). When the fixed-wing aircraft 14 is coupled to the rotary wing aircraft 12 and the wings 24, 26 are tilted to the vertical mode; the proprotors 28, 30 may provide additional lift to the rotary wing aircraft 12. When docked and in the vertical mode, the wings 24, 26 and proprotors 28, 30 may provide addition vertical takeoff and landing (VTOL), short takeoff and landing (STOL), short takeoff and vertical landing (STOVL), one engine inoperative (OEI), and low speed maneuver capabilities to the rotary wing aircraft 12 using helicopter-type controls.

Figure 14:
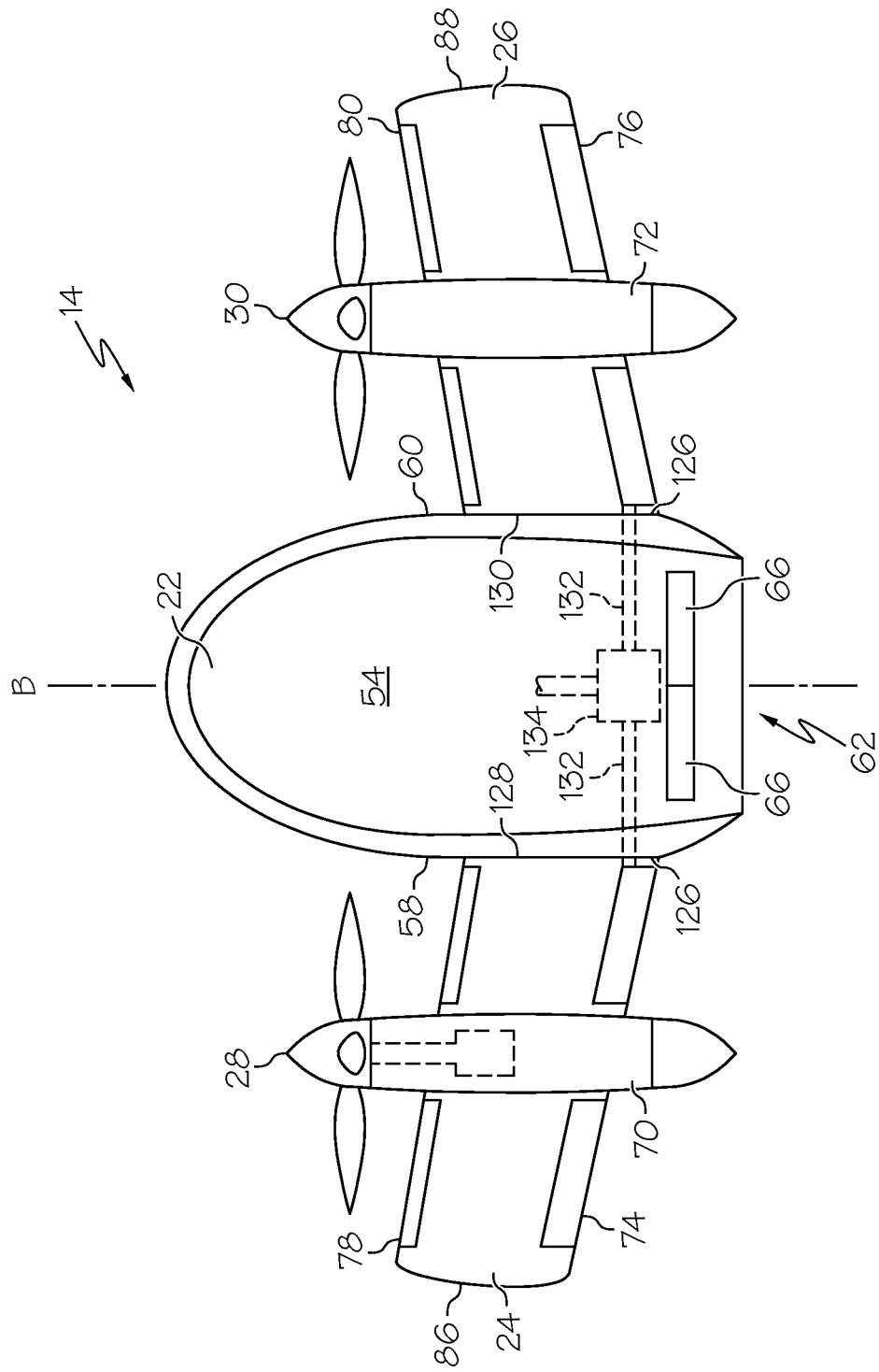
FIG. 14 is a top plan view of the fixed-winged aircraft of FIG. 12.
Figure 15:
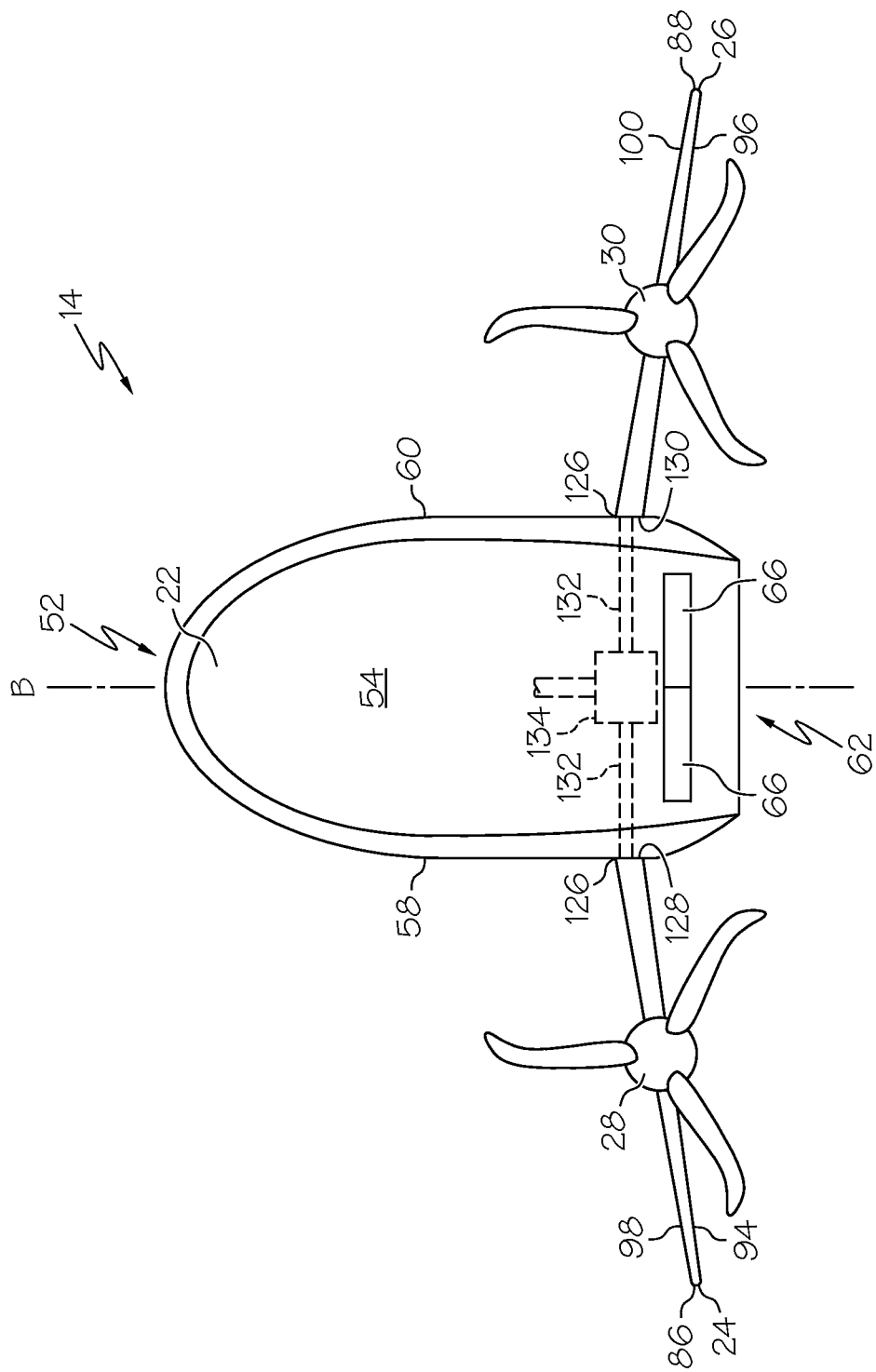
FIG. 15 is a top plan view of the fixed-wing aircraft of FIG. 13.

Referring to FIGS. 14 and 15, the wings 24, 26 may be rotatably attached to the center body 22 and may transition between a generally horizontal position, substantially parallel to a longitudinal axis "B" of the center body 22 and a generally vertical position, substantially perpendicular to the longitudinal axis "B" of the center body 22. A small gap 126 may be provided between a left and right inner end 128, 130 of the wings 24, 26 and the center body 22. The gap 126 may provide sufficient clearance for the wings 24, 26 to rotate, i.e., tilt, between the horizontal and vertical modes. The wings 24, 26 may be rotatably attached near the trailing edges 74, 74 by at least one cross shaft 132 connected to a coupling gear box 134 as shown schematically in dashed lines. The cross shaft 132 may be driven by the engine 33 or by an independent electric, hydraulic, or pneumatic motor (not shown) mechanically connected to the gear box 134 to allow for synchronized rotation of the wings 24, 26. Alternatively, pivot arms may be connected to the wings 24, 26 to push or pull the wings 24, 26 between the horizontal and vertical positions. Alternatively still, motors (not shown) may be connected directly between the wings 24, 26 and the center body 22.

A pitch control system may control blade pitch around a pitch axes. With collective pitch control, the pitch of both blades 32 may be changed simultaneously. When blade pitch is changed collectively, the pitch change is the same, independent of blade position within the disc 124. Since a pitch control system is capable of collective pitch control, it may be a "collective pitch control system." However, it may also be a "cyclic pitch control system." With cyclic pitch control, blade pitch is dependent on blade position within the disc 124. Cyclic pitch control varies blade pitch around the disc 124 so that pitch is reduced on one side of the disc 124 and increased on the other side of the disc 124.

Advantageously as illustrated in the text and the figures above, the compound rotorcraft provides in VTOL mode, UAS can takeoff/land as a tail-sitter using cyclic/collective pitch in the proprotors. In yet another advantage of the disclosed compound rotorcraft, the UAS can be detached "detachable" in-flight and utilized as a high speed armed escort/wingman or BLOS sensor platform. Furthermore, UAS can carry internal and external weapons, sensors and/or fuel. In one variant, when docked to helicopter, UAS adds additional VTOL/STOL/OEI and lowspeed maneuver capability with helicopter-type controls. For example, single turboshaft (2,000+ shp class) enables 350+ knot dash speeds for deployed UAS. In another variant, when the disclosed compound rotorcraft is in airplane mode, UAS adds lift and propulsion compounding to helicopter with wing and proprotors that increase cruise/dash speed.

For example, the increased cruise/dash speed may be approximately 40 knots. In another example, when UAS is docked, forward and aft cargo hooks on helicopter remain useable for external loads—a hatch within the cabin allows access to UAS equipment bay to refuel and/or rearm in flight. As such, the disclosed compound rotorcraft provides for a speed augmentation for any rotorcraft that normally flies on the edgewise rotors without installing the compounding features like the wing or propellers or rotors on the rotorcraft.

As illustrated in one or more examples above, the UAV attaches to the rotorcraft at about or near its mid-point and at the lowest portion of the outer mould line beneath the rotorcraft. The UAV wing is able to tilt which also tilts the propellers or rotors and provides additional lift compared to the uncompounded rotorcraft. As such, the trapeze extension and retraction system disclosed above advantageously provides, but not limited to, any or all the following: autonomous unmanned flight and the ability to dock with another rotorcraft, ability to provide fixed-wing speed augmentation to the docked rotorcraft, increased range, added propulsion, added payload capability for the rotorcraft due to added fuel, docked and undocked system flexibility to increase mission capabilities, wing and propellers tilting provides for STOVL flight operations, autonomous operations by the UAV minimizes the rotorcraft pilots' workload, speed, range, lift, payload capabilities may be automatically delivered to rotorcraft, remote or wingman operation of UAV with re-dock is rotorcraft paradigm shift, and autonomous UAV operation does not adversely influence rotorcraft capability, and UAV compounding of rotorcraft is low cost alternative to installed components.

Accordingly, the disclosed compound rotorcraft may employ any type of rotary wing aircraft that may be coupled or docked to a fixed-wing aircraft to become a compound rotorcraft, such that the resulting paired platform has improved performance and capabilities. The coupled platform provides the advantage that a traditional rotorcraft can be compounded without adding any additional drive components to the existing aircraft platform. The compound platform may provide system flexibility, which increases mission capabilities with only minimal modification required to the rotorcraft and without installation of additional equipment.

Although various embodiments of the disclosed compound rotorcraft and winged aircraft have been shown and described, modifications may occur to those skilled in the art upon reading the specification. The present application includes such modifications and is limited only by the scope of the claims.

What is claimed is:

1. A compound rotorcraft comprising:
 a rotary wing aircraft comprising a fuselage and at least one rotor; and
 a fixed-wing aircraft releasably coupled to said fuselage of said rotary wing aircraft, said fixed-wing aircraft comprising a wing and a propulsion drive,
 wherein said compound rotorcraft flies on said rotor, on said propulsion drive, or on both said rotor and said propulsion drive,
 wherein said fixed-wing aircraft is detachable from said rotary wing aircraft such that said fixed-wing aircraft and said rotary wing aircraft fly independent of one another, and
 wherein said fixed-wing aircraft is a tail-sitting vertical takeoff and landing aircraft.

2. The compound rotorcraft of claim 1 wherein said rotary wing aircraft comprises a docking bay disposed about a lower midpoint of an underside of said fuselage, and wherein said fixed-wing aircraft is at least partially received in said docking bay.

3. The compound rotorcraft of claim 2 wherein said rotary wing aircraft further comprises a docking trapeze to engage said fixed-wing aircraft.

4. The compound rotorcraft of claim 3 wherein said docking trapeze comprises:
   a motor;
   an actuator mechanism driven by said motor, said actuator mechanism being downwardly extendable from said docking bay and upwardly retractable within said docking bay; and
   a latching mechanism disposed at a lower end of said actuator mechanism to releasably engage the fixed-wing aircraft.

5. The compound rotorcraft of claim 4 wherein said fixed-wing aircraft comprises a latching port to receive said latching mechanism.

6. The compound rotorcraft of claim 1 wherein said rotary wing aircraft comprises at least one docking port having a mechanical docking point and electrical connection to mechanically and electrically couple said fixed-wing aircraft to said rotary wing aircraft.

7. The compound rotorcraft of claim 6 wherein said fixed-wing aircraft comprises at least one docking port connector having a mechanical docking connector and electrical connector to mechanically and electrically connect to said docking port.

8. The compound rotorcraft of claim 1 wherein said fixed-wing aircraft comprises:
   a center body;
   a left wing extending outwardly from said center body;
   a right wing extending outwardly from said center body away from said left wing;
   a left proprotor mounted on said left wing; and
   a right proprotor mounted on said right wing.

9. The compound rotorcraft of claim 8 wherein said left wing and said right wing are rotatably attached to said center body and translatable between a generally horizontal position and a generally vertical position.

10. The compound rotorcraft of claim 1 wherein said fixed-wing aircraft is a flying wing.

11. The compound rotorcraft of claim 1 wherein said fixed-wing aircraft is an unmanned aerial vehicle.

12. The compound rotorcraft of claim 1 wherein the fixed-wing aircraft is a manned aerial vehicle.

13. The compound rotorcraft of claim 1 wherein said fixed-wing aircraft comprises a payload to augment said rotary wing aircraft.

14. A method for compounding a rotary wing aircraft comprising a fuselage, at least one rotor and a docking bay disposed on an underside of said fuselage, said method comprising the steps of:
   providing a fixed-wing aircraft comprising at least one wing and a propulsion drive, wherein said fixed-wing aircraft is a tail-sitting vertical takeoff and landing aircraft and flies independent of said rotary wing aircraft; and
   releasably coupling said fixed-wing aircraft to said docking bay of said rotary wing aircraft to form a compound aerial platform, wherein said compound aerial platform flies on said rotor, on said propulsion drive, or on both said rotor and said propulsion drive.

15. The method of claim 14 further comprising detaching said fixed-wing aircraft from said rotary wing aircraft, wherein said detached fixed-wing aircraft and said rotary wing aircraft fly independent of one another.

16. The method of claim 14 wherein said releasably coupling step comprises engaging said fixed-wing aircraft with a docking trapeze.

17. The method of claim 16 wherein said docking trapeze comprises:
   a motor;
   an actuator mechanism driven by said motor, said actuator mechanism being downwardly extendable from said docking bay and upwardly retractable within said docking bay; and
   a latching mechanism disposed at a lower end of said actuator mechanism to releasably engage the fixed-wing aircraft.

18. The method of claim 17 wherein said fixed-wing aircraft comprises a latching port to receive said latching mechanism.

19. The method of claim 14 wherein said fixed-wing aircraft is an unmanned aerial vehicle.

20. A compound rotorcraft comprising:
   a rotary wing aircraft comprising a fuselage and at least one rotor; and
   a fixed-wing aircraft releasably coupled to said fuselage of said rotary wing aircraft, said fixed-wing aircraft comprising:
      a center body;
      a left wing and a right wing rotatably attached to said center body and translatable between a generally horizontal position and a generally vertical position; and
      a propulsion drive coupled to said left wing and said right wing,
   wherein said compound rotorcraft flies on said rotor, on said propulsion drive, or on both said rotor and said propulsion drive, and
   wherein said fixed-wing aircraft is detachable from said rotary wing aircraft such that said fixed-wing aircraft and said rotary wing aircraft fly independent of one another.

* * * * *